United States Patent
Bagwell (10) Patent No.: US 11,356,950 B1
(45) Date of Patent: *Jun. 7, 2022

(54) SYSTEMS AND METHODS FOR STUNNING NETWORK NODES

(71) Applicant: Synapse Wireless, Inc., Huntsville, AL (US)

(72) Inventor: Coleman D. Bagwell, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,674

(22) Filed: Feb. 19, 2021

Related U.S. Application Data (63) Continuation of application No. 16/387,189, filed on Apr. 17, 2019, now Pat. No. 10,959,176.

(51) Int. Cl.
| | |
|---|---|
| *H04W 52/02* | (2009.01) |
| *H04W 8/22* | (2009.01) |
| *H04W 68/00* | (2009.01) |
| *H04W 8/26* | (2009.01) |
| *H04W 76/11* | (2018.01) |
| *H04W 76/28* | (2018.01) |
| *H04W 84/18* | (2009.01) |

(52) U.S. Cl.
CPC ......... *H04W 52/0229* (2013.01); *H04W 8/22* (2013.01); *H04W 8/26* (2013.01); *H04W 68/005* (2013.01); *H04W 76/11* (2018.02); *H04W 76/28* (2018.02); *H04W 84/18* (2013.01)

(58) Field of Classification Search
CPC .......................... H04W 52/02; H04W 52/0229
See application file for complete search history.

(56) References Cited

U.S. PATENT DOCUMENTS

| | | |
|---|---|---|
| 7,978,717 B2 | 7/2011 | Banks et al. |
| 9,298,954 B1 | 3/2016 | Ewing |
| 9,503,974 B1 | 11/2016 | Ewing et al. |

(Continued)

OTHER PUBLICATIONS

Coleman D. Bagwell, U.S. Appl. No. 16/387,189, entitled, "Systems and Methods for Stunning Network Nodes," filed Apr. 17, 2019.

*Primary Examiner* — Sulaiman Nooristany
(74) *Attorney, Agent, or Firm* — Synapse Wireless, Inc.; Jon E. Holland (57) ABSTRACT

A system for a tag includes a network controller that, when it has information to send to a tag, is configured to communicate with the tag's neighbors, such as anchors that may be used for communication between the tag and the network controller. In this regard, the network controller may instruct the tag's neighbors to stun the tag upon hearing from the tag. Thus, when the tag transitions out of a sleep state and transmits a status message or other type of message to the network controller or other resource of the network, at least one neighbor of the tag hears the message and, in response, stuns the tag so that it remains awake for a longer period of time, thereby giving the network controller sufficient time to send control information or other information to the tag. Since the neighbors are responsible for stunning the tag, the amount of time required to stun the tag after it awakens from the sleep state is decreased.

10 Claims, 5 Drawing Sheets

(56) References Cited

U.S. PATENT DOCUMENTS 9,763,062 B2 9/2017 Ibarra
2016/0081022 A1* 3/2016 Haneji ................ H04W 76/28
370/311

* cited by examiner

SYSTEMS AND METHODS FOR STUNNING NETWORK NODES

CROSS REFERENCE TO RELATED APPLICATION

This application is a continuation of and claims priority to U.S. patent application Ser. No. 16/387,189, entitled "Systems and Methods for Stunning Network Nodes" and filed on Apr. 17, 2019, which is incorporated herein by reference.

RELATED ART

Wireless networks, such as wireless mesh networks, are increasingly used for data communication in a variety of applications. Such networks often include stationary nodes, sometimes referred to as "anchors," that route messages through the network. Some wireless networks also include mobile nodes, sometimes referred to as tags, that are battery-powered and thus frequently transition to a sleep state from time-to-time in order to conserve power. As an example, a tag may be coupled to an asset that is to be monitored, tracked, and/or controlled by the tag.

In some cases, a tag may operate under the control of a network resource, referred to hereafter as "network controller," that communicates with the tag through the wireless network. For example, the network controller may communicate with the tag in order to command it to perform certain tasks, to discover information about the tag (e.g., the tag's current location), or to send firmware or software updates to the tag. After the tag transitions from a sleep state to an awake state, the tag may be configured to transmit a message to the network controller. As an example, the tag may take readings from one or more sensors or otherwise receive or determine information relevant to the tag's status (e.g., the location of the tag), and transmit to the network controller a status message indicative of the tag's status. Such status message may include the information read, received, or otherwise determined by the tag after transitioning to the awake state.

Often, after transmitting the status message, the tag is configured to remain awake for a predetermined amount of time before transitioning back to the sleep state. Such amount of time is sufficient for the network controller to receive the status message and transmit a reply back to the tag. If the network controller has any information to send to the tag (e.g., a firmware or software update or other control information), the network controller may transmit a command, referred to herein as a "stun command," for stunning the tag. In response to the stun command, the tag is configured to remain in the awake state longer after transmission of the status message in order to give the network controller sufficient time to send the information to the tag.

Thus, when the network controller has no information to communicate to the tag, the tag quickly transitions back to the sleep state after sending a status message to the network controller. However, when the network controller has information to communicate with the tag, the network controller stuns the tag such that it remains awake for a longer period of time in order to receive further information from the network controller. These techniques help to efficiently utilize the power resources of the tag, thereby extending the useful life of the tag's batteries. However, further efficiencies to help conserve the power resources of the tag are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for stunning network nodes, such as tags. In one exemplary embodiment, when a network controller has information to send to a tag, the network controller is configured to communicate with the tag's neighbors, such as anchors that may be used for communication between the tag and the network controller. In this regard, while the tag is still in the sleep state or at other times, the network controller may instruct the tag's neighbors to stun the tag upon hearing from the tag. Thus, when the tag transitions out of a sleep state and transmits a status message or other type of message to the network controller or other resource of the network, at least one neighbor of the tag hears the message and, in response, stuns the tag so that it remains awake for a longer period of time, thereby giving the network controller sufficient time to send control information or other information to the tag. Since the neighbors are responsible for stunning the tag, the amount of time required to stun the tag after it awakens from the sleep state is decreased. That is, the amount of time required for a neighbor to stun the tag is less than the amount of time required for the network controller to receive the status message and then transmit a stun command to the tag.

Thus, in situations when there is no information to be communicated from the network controller to the tag, the predetermined amount of time that the tag waits for a stun command before transitioning back to the sleep state may be reduced, thereby enabling the tag to transition to the sleep state sooner. Although the power savings for enabling a quicker return to the sleep state for any given sleep/wake cycle may be small, the net effect of allowing the tag to return to the sleep state quicker over a large number of sleep/wake cycles can be significant.

Figure 1:
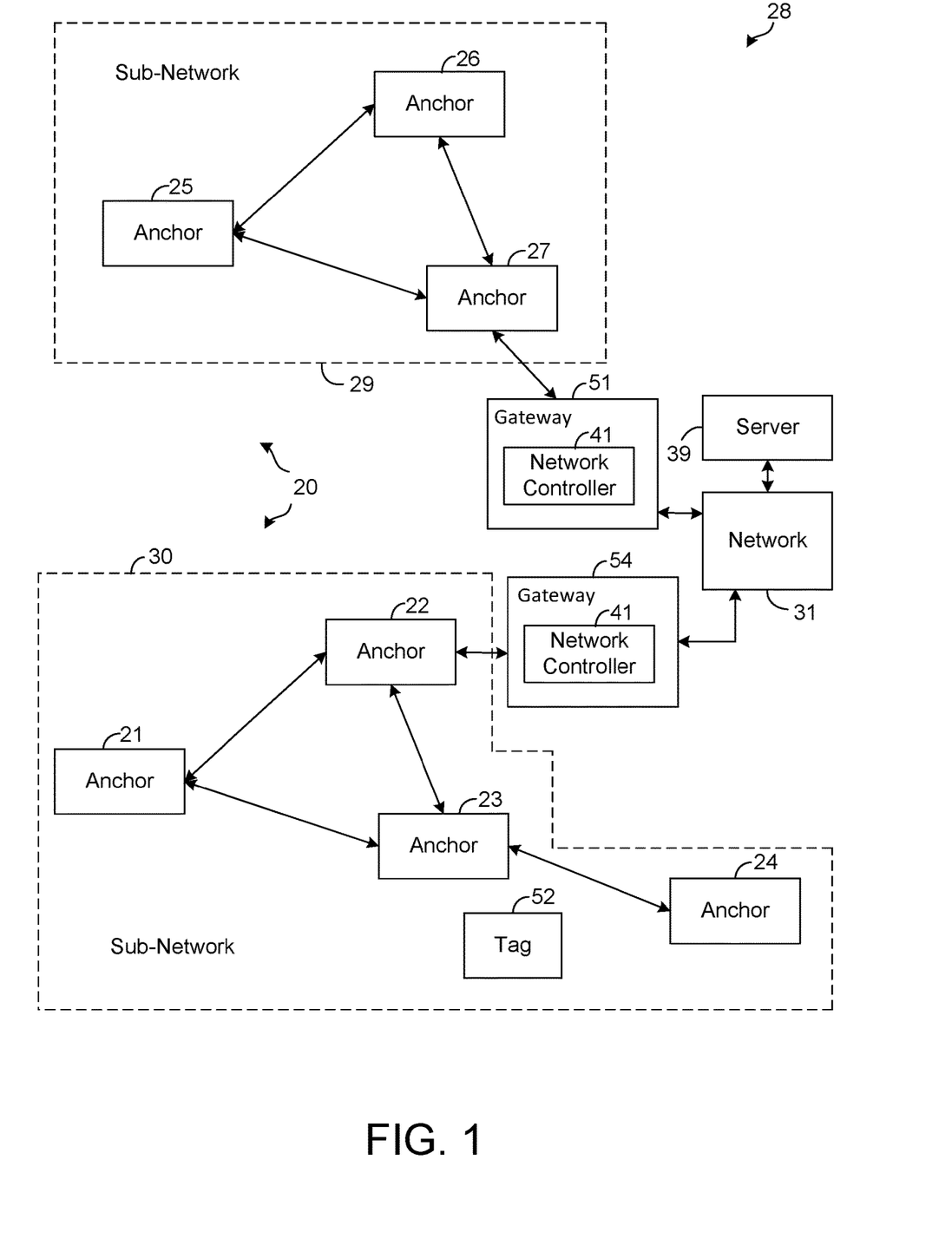
FIG. 1 is a block diagram illustrating an exemplary embodiment of a network system for stunning a tag.

FIG. 1 depicts an exemplary embodiment of a networked communication system 28. As shown by FIG. 1, the system 28 comprises a wireless network 20 having a plurality of nodes 21-27. In one exemplary embodiment, the nodes 21-27 are stationary and shall be referred to hereafter as "anchors," but any of the nodes 21-27 may be mobile in other embodiments. FIG. 1 depicts seven anchors 21-27 for simplicity, but the network 20 may have any number of anchors 21-27 in other embodiments. In one exemplary embodiment, the network 20 is implemented as a mesh network, but other types of networks may be implemented in other embodiments. Exemplary networks are described in commonly-assigned U.S. Pat. No. 7,970,871, entitled "Systems and Methods for Dynamically Configuring Node Behavior in a Sensor Network, and filed on May 2, 2008, which is incorporated herein by reference, and in commonly-assigned U.S. Pat. No. 9,619,989, entitled "Asset Tracking Systems and Methods" and filed on May 1, 2014, which is incorporated herein by reference.

Each anchor 21-27 is able to communicate with any of the other anchors 21-27. In one exemplary embodiment, the anchors 21-27 communicate among one another wirelessly, but it is possible for any of the anchors 21-27 to communicate with any of the other anchors 21-27 over a conductive medium or otherwise. Messages may hop from anchor-to-anchor in order to reach a destination. For example, in the exemplary embodiment shown by FIG. 1, the anchors 21-23 are within range of each other such that any of the anchors 21-23 can communicate directly with any of the other anchors 21-23. However, the anchor 24 is only within range of anchor 23. The other anchors 21 and 22 can use the anchor 23 to route or otherwise transmit a message to the anchor 24. In one exemplary embodiment, each anchor 21-27 has a routing table that indicates designated routes for messages. As known in the art, routing tables can be created and updated via a variety of techniques. In general, anchors communicate among one another to learn of data paths for various destinations. Once a path to a particular destination is discovered, the routing table or tables of the anchors along the path may be updated and later used to route a message to the destination.

As known in the art, a unicast message is a message that is routed to a particular node (e.g., anchor) identified by the message. In this regard, each unicast message includes a source address indicating the network address of the node from which the message originated and a destination address indicating the network address of the node that is to receive the message. The unicast message also includes a next-hop address identifying the next node that is to receive the message as it is progressing toward the destination node. The nodes communicate with one another to learn routes through the network 20, and the nodes' routing tables are updated to indicate the learned routes. Based on these routing tables, a unicast message hops through the network, node-by-node, until the message reaches its identified destination. When a node receives a unicast message, the node will process the unicast message only if it is identified by the message's next-hop address or destination address. Before retransmitting the message, the node uses its routing table to determine the next hop for the message and updates the next-hop address in the message so that it identifies the next node that is to receive the message.

Multicast messages, on the other hand, are not forwarded based on routing tables but are instead rebroadcast by nodes that receive it. In this regard, each multicast message includes a source address indicating the network address of the node from which the message originated. Rather than having a destination address identifying a single destination node, a multicast message often has a group identifier identifying a group of nodes that are to receive and process the message. One type of message, referred to as a "broadcast" message, is to be processed by all of the nodes that receive it. Generally, each node that receives the multicast message retransmits the multicast message so that it can be heard by the other nodes within range of the transmitting node. Thus, the multicast message should eventually reach each node within the identified multicast group. The multicast message has a time-to-live value that is decremented each time it is retransmitted, and the nodes stop retransmitting the multicast message once this value falls below a threshold. Such practice eventually stops propagation of the multicast message so that it is not retransmitted in perpetuity. If desired, parameters (e.g., time-to-live value and multicast group identifier) in the header of a multicast message can be set such that the multicast message reaches each node of the network 20 or any group of nodes within the network 20, such as at least the anchors of a particular sub-network. If desired, a multicast message may have a destination address or group identifier identifying a single node. In such case, the message is rebroadcast through the network 20, and the node identified as the message's destination or group further processes the message as may be desired, whereas the other nodes that receive the message only retransmit the message.

In one exemplary embodiment, the nodes of the network 20 are designed to communicate only multicast messages. That is, unicast messages are not used, and there is no need for the nodes to build routing tables. Such an embodiment can significantly reduce congestion and data collisions since it is unnecessary for the nodes to communicate additional messages for discovering routes through the network. For illustrative purposes, it will be assumed hereafter that the nodes of the network 20 communicate only multicast message unless otherwise indicated herein.

As illustrated by FIG. 1, the anchors 21-27 may be arranged in groups, referred to herein as "sub-networks." FIG. 1 shows two sub-networks 29 and 30, but any number of sub-networks is possible. In particular, sub-network 29 includes anchors 21-24, and sub-network 30 includes anchors 25-27. Each sub-network 29 and 30 has a respective gateway 51 or 54 through which the anchors of the sub-network communicate in order to access a network 31, such as a local area network (LAN) or wide area network (WAN). In the embodiment shown by FIG. 1, each gateway 51 and 54 interfaces messages between the protocol of the network 20 and the protocol of the network 31, such as a LAN and/or WAN. As an example, in one embodiment, each gateway 51 and 54 is communicatively coupled to the network 31, and the network 31 employs Ethernet and/or Transmission Control Protocol/Internet protocol (TCP/IP) or other type of protocol that is different than the protocol of the network 20. Each gateway 51 and 54 encapsulates messages received from its respective sub-network in accordance with an applicable Ethernet protocol for communication through the network 31. If desired, a gateway 51 or 54 may de-encapsulate the messages received from the wireless network 20 or alternatively encapsulate both payload and overhead (e.g., a header) of the received messages for transmission through the network 31. In the opposite direction, each gateway 51 and 54 de-encapsulates messages from the network 31 to recover packets in accordance with the protocol of the wireless network 20. If the recovered data is already compatible with the protocol of the wireless network 20, the gateway 51 or 54 may simply transmit the recovered data to an anchor of its respective sub-network. Otherwise, the gateway 51 or 54 may encapsulate the recovered data in accordance with the protocol of the wireless network 20.

In the embodiment depicted by FIG. 1, each gateway 51 and 54 includes a respective network controller 41 and 42 that is configured to control the nodes (e.g., anchors and tags) within the gateway's respective subnetwork 29 and 30. In other embodiments, any network controller 41 and 42 may be at any other location, such as within the server 39, an anchor 21-27, or any other node of the network 20. The operation and functionality of a network controller will be described in more detail below.

In some embodiments, the nodes of the wireless network 20, such as anchors 21-27 and one or more tags, which will be described in more detail hereafter, may be respectively assigned to a network controller 41 or 42, which is configured to control the nodes assigned to it. That is, each network controller 41 and 42 may be configured to perform control functions for the nodes that are assigned to it. As an example, the nodes of the sub-network 30 may be assigned to the network controller 41 in close proximity to such nodes, and the nodes of the sub-network 29 may be assigned to the network controller 42 in close proximity to such nodes. As a node moves, it may be re-assigned to a network controller that is closer to the node or that communicates more reliably with the node.

For each node (e.g., anchor 21-27 or tag 52) assigned to it, a network control 41 or 42 is configured to perform certain functions related to the node, such as monitor, track, or control the node. As an example, the network controller 41 may be configured to send a command or change the configuration of a node assigned to it. In addition, the network controller 41 or 42 may be configured to send firmware or software updates to the nodes of its corresponding sub-network 29 or 30. As an example, when a firmware update occurs, the server 39 may push the firmware update to each network controller 41 and 42, which then communicates with nodes within its respective sub-network in order to send the firmware update to each node within the sub-network that is to be updated. In other embodiments, the network controllers 41 and 42 may perform other control functions for the nodes under their control.

As shown by FIG. 1, the system 28 comprises at least one mobile node 52, referred to hereinafter as a "tag," that is configured to wirelessly communicate with the anchors 21-27 as the tag 52 is moved through a geographical location at which the anchors 21-27 are situated. In one exemplary embodiment, the tag 52 is a node of the network 20, but it is not configured to route messages through the wireless network 20. That is, the tag 52 may transmit a network message to an anchor 21-27 for communication of the message through the wireless network 20. Also, messages identifying the tag 52 are communicated through the wireless network 20 such that they are received by the tag 52. However, the tag 52 does not serve as an intermediate hop for messages, including multicast messages that do not identify it. Preventing the tag 52 from performing routing functions helps to conserve the tag's power. In this regard, not only are the tag's functions reduced, but the tag 52 may sleep from time-to-time while the anchors 21-27 remain operational for routing functions.

As an example, from time-to-time, the tag 52 may be configured to transition to a sleep state in which components of the tag 52 are deactivated so that the tag 52 consumes less power. In particular, the tag's communication components may be deactivated such that the tag 52 is unable to communicate with external devices while in a sleep state. If desired, the tag 52 may be configured to periodically awaken from its sleep state, briefly communicate with at least one anchor 21-27 so that its location can be discovered and information can be exchanged for a brief period of time, and then transition back to a sleep state, as will be described in more detail hereafter. Thus, the tag 52 can be configured to spend a significant amount of time in a sleep state such that the useful life of the tag's batteries is significantly extended.

In some embodiments, each tag 52 (like the anchors 21-27) is assigned to a respective network controller 41 or 42 that performs various control functions for the tag 52. In the embodiment shown by FIG. 1, the tag 52 is located in a geographic region corresponding with the sub-network 30, and the tag 52 may be assigned to the network controller 41 associated with such region. When the tag 52 transitions from a sleep state to an awake state, the tag 52 is configured to transmit a message, referred to hereafter as "tag status message," to its respective network controller 41 that is controlling the sub-network 30 in which the tag 52 is located. Such tag status message may include information indicative of the tag's status, such as sensor readings by the tag 52 or other information acquired by the tag 52 since the tag transitioned from the sleep state. As an example, the tag status message may include information indicative of the tag's current location. For example, the tag 52 may measure the signal strength of at least one signal from at least anchor 21-24 or other resource, and include the measured signal strengths in the tag status message, which may then be used to determine the tag's location. In other embodiments, other types of information may be included in the tag status message.

Figure 2:
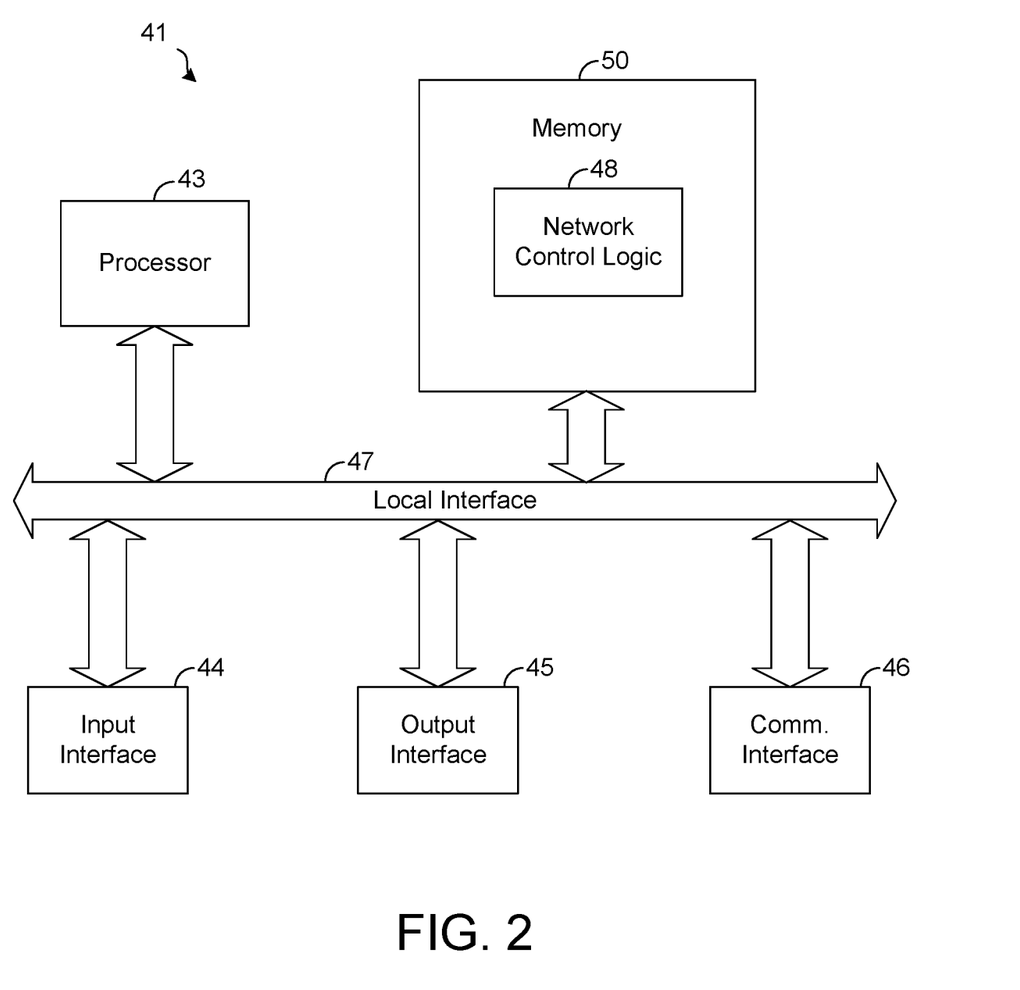
FIG. 2 is a block diagram illustrating an exemplary embodiment of a network controller, such as is depicted by FIG. 1.

FIG. 2 depicts an exemplary embodiment of a network controller 41. Note that the network controller 42 may be configured similarly to or identical to the network controller 41 depicted by FIG. 2. As shown by FIG. 2, the network controller 41 comprises logic 48, referred to herein as "network control logic," for performing various control functions for the nodes of sub-network 30, as described further herein.

The network control logic 48 can be implemented in software, hardware, firmware or any combination thereof. In the exemplary network controller 41 illustrated by FIG. 2, the network control logic 48 is implemented in software and stored in memory 50 of the network controller 41. Note that the network control logic 48, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The exemplary network controller 41 depicted by FIG. 2 comprises at least one conventional processor 43, which comprises processing hardware for executing instructions stored in memory 50. As an example, the processor 43 may comprise a central processing unit (CPU) or a digital signal processor (DSP). The processor 43 communicates to and drives the other elements within the network controller 41 via a local interface 47, which can include at least one bus. Furthermore, an input interface 44, for example, a keypad, can be used to input data from a user, and an output interface 45, for example, a liquid crystal display (LCD) or other display apparatus, can be used to output data to the user. Further, a communication interface 46 may be used to exchange data with the network 31 (FIG. 1) and nodes of the sub-network 30. As an example, the communication interface 46 may comprise an RF radio for communicating wireless signals with the anchor 22 or other nodes of the sub-network 30.

The network control logic 48 is configured to manage the sub-network 30 and transmit messages (e.g., one or more commands or a firmware update) to the nodes in the sub-network 30. As described above, the tag 52 may transmit a tag status message to the network controller 41, and the network control logic 48 may be configured to process the tag status message. As an example, the network control logic 48 may be configured to forward information in the tag status message to the server 39 (FIG. 1) or other resource, store information in the tag status message, or use the information in the tag status message to perform various functions, such as determining the location of the tag 52. Reception of the tag status message indicates to the network control logic 48 that the tag 52 has transitioned from the sleep state, and in response, the network controller 41 may send at least one message to the tag 52. As an example, the network control logic 48 may transmit a command or a firmware or software update to the tag 52. As will be described in more detail below, when there is information to be communicated to the tag 52, the tag 52 is preferably stunned so that it remains awake for sufficient amount of time for the network control logic 48 to transmit information to the tag 52.

Figure 3:
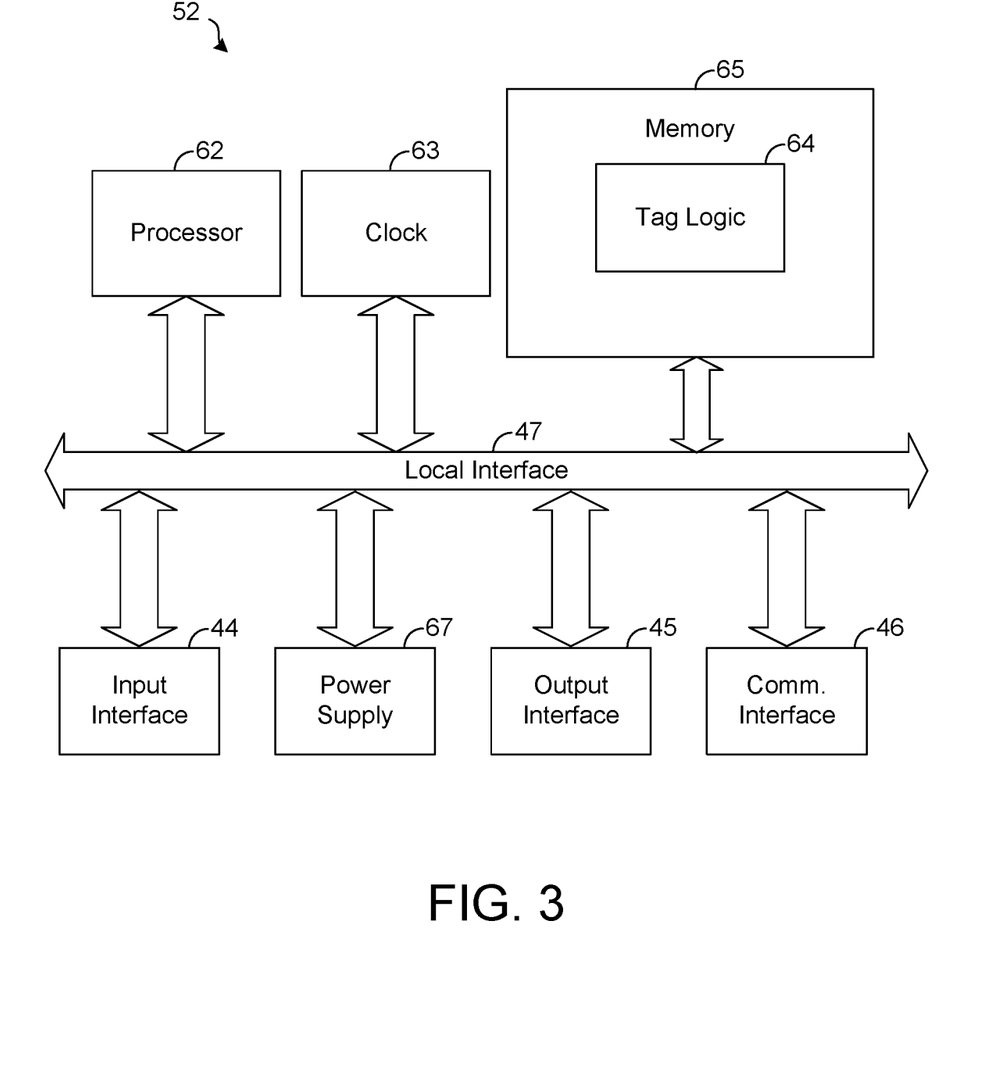
FIG. 3 is a block diagram illustrating an exemplary embodiment of a tag, such as is depicted by FIG. 1.

FIG. 3 depicts an exemplary embodiment of a tag 52. As shown by FIG. 3, the tag 52 comprises logic 64, referred to herein as "tag logic," for generally controlling the operation of the tag 52, as will be described in more detail hereafter. The tag logic 64 can be implemented in software, hardware, firmware or any combination thereof. In the exemplary tag 52 illustrated by FIG. 3, the tag logic 64 is implemented in software and stored in memory 65 of the tag 52. Note that the tag logic 64, when implemented in software, can be stored and transported on any computer-readable medium for use by or in connection with an instruction execution apparatus that can fetch and execute instructions.

The exemplary tag 52 depicted by FIG. 3 comprises at least one conventional processor 62, which comprises processing hardware for executing instructions stored in memory 65. As an example, the processor 62 may comprise a central processing unit (CPU) or a digital signal processor (DSP). The processor 62 communicates to and drives the other elements within the tag 52 via a local interface 47, which can include at least one bus. In addition, the tag 52 has a communication interface 46, which comprises an RF radio or other device for communicating wirelessly. The tag 52 also has a power supply 67, such as one or more batteries, which provide electrical power to the components of the tag 52. The tag 52 has a clock 63 for tracking time. Furthermore, an input interface 44, for example, a keypad, can be used to input data from a user, and an output interface 45, for example, a liquid crystal display (LCD) or other display apparatus, can be used to output data to the user.

In one exemplary embodiment, the tag 52 is mobile, although the tag 52 may be stationary if desired in other embodiments. Further, as described above, the tag logic 64 may be configured to transmit a tag status message via the communication module 69 after transitioning from a sleep state to an awake state. The tag status message may include an identifier unique to the tag 52, referred to herein as "tag identifier," which may be the network address of the tag 52 in the network 20, and other information indicative of the tag's status, such as a remaining charge of the tag's power supply 67, readings from one or more sensors (not shown in FIG. 3), or other information.

The tag logic 64 may transition the tag 52 into a sleep state from time-to-time. A "sleep/wake cycle" generally refers to a cycle when the tag transitions from the sleep state to an awake state and then back to the sleep state. While in the awake state, the tag logic 64 may perform various functions, such as transmitting the tag status message to its corresponding network controller 41.

In one exemplary embodiment, the tag 52 is configured to spend a significant amount of time sleeping in an effort to conserve the tag's power resources and, specifically, to extend the useful life of batteries that are used to power the tag 52. As described above, the tag 52 may transition to a sleep state in which components of the tag 52 are deactivated so that they consume less power. While in such a sleep state, the functionality of the tag 52 is limited. As an example, the communication interface 46 (e.g., a wireless transmitter and wireless receiver) may be deactivated such that wireless communication with the tag 52 is not possible until the tag 52 awakens from its sleep state and activates the communication interface 46.

In an exemplary embodiment, after transmission of the tag status message, the tag logic 64 may power the communication interface 46 of the tag 52, to make the tag 52 stay awake for a time period, referred to herein as "Normal Awake Period," before reverting the tag 52 to the sleep state again. In the depicted embodiment, the tag logic 64 may receive a stun command from a neighbor node, such as one or more anchors 21-24 in direct communication range with the tag 52, within the Normal Awake Period. In this regard, a first node is in "direct communication range" with a second node when it is sufficiently close to the second node so that a message can be received by the second node directly from the first node without hopping through other nodes of the network 20. In some embodiments, the stun command is a one-hop multicast message. That is, the time-to-live value of the stun command may be set so that it is transmitted only one hop (i.e., is not retransmitted by another node that receives the message) in an effort to reduce network congestion. The stun command may indicate to the tag 52 to stay awake for a longer period of time (i.e., beyond expiration of the Normal Awake Period when the tag 52 would normally transition back to the sleep state in the absence of the stun command) so that the tag 52 may receive a message from the network controller 41. In some embodiments, the stun command may include a data value indicative of the amount of time that the tag 52 is to remain awake such that the network controller 41 can control when the tag 52 transitions back to the sleep state. In other embodiments, the amount of time that the tag 52 remains awake after receiving the stun command may be predefined, such as a certain amount of time after expiration of the Normal Awake Period. In other embodiments, the stun command may be other types of messages, such as a unicast message, and other techniques for controlling the duration of the awake state in response to a stun command are possible.

In an exemplary embodiment, the tag logic 64, after receiving the stun command within the Normal Awake Period, may be configured to further power the communication module 46 of the tag 52, thereby keeping the tag 52 awake for a period of time, referred to hereafter as "Extended Awake Period," beyond the Normal Awake Period to enable the tag 52 to receive one or more messages from the network controller 41 after the Normal Awake Period. Further, in an exemplary embodiment, the Extended Awake Period is predefined (e.g., a certain number of seconds after expiration of the Normal Awake Period. However, it is unnecessary for the Extended Awake Period to be predefined. As an example, the duration of the Extended Awake Period may be controlled by the network controller 41 and transmitted to the tag 52 in the stun command or other message received by the tag 52. As an example, the network controller 41 may control the duration of the Extended Awake Period and, thus, the overall time that the tag 52 remains awake during the current sleep-wake cycle based on the location of the tag 52 in the sub-network 30. In this regard, a tag 52 located farther (e.g., more hops) from the network controller 41 may be assigned a longer Extended Awake Period. In other embodiments, other techniques for controlling the duration of the Extended Awake Period are possible.

In some embodiments, the tag logic 64, on receipt of the stun command, may be configured to transmit a notification message to the network controller 41 via one or more neighboring anchors 21-24. The notification message may indicate that the tag 52 has received the stun command and, in embodiments in which the duration of the Extended Awake Period is predefined or controlled by the Tag 52, the message may also indicate the duration of the tag's Extended Awake Period. In other embodiments, other types of responses are possible, and it is unnecessary for the tag 52 to communicate a response to the stun command.

Figure 4:
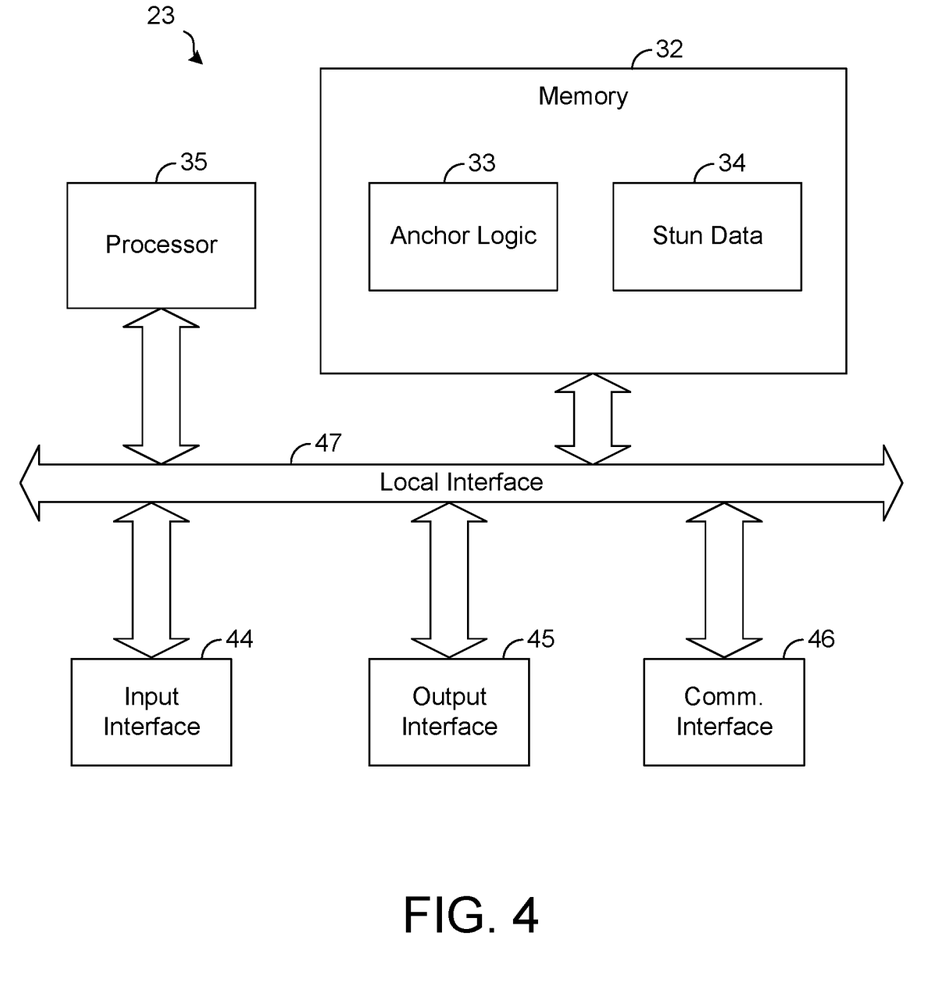
FIG. 4 is a block diagram illustrating an exemplary embodiment of an anchor, such as is depicted by FIG. 1.

FIG. 4 is a block diagram illustrating an exemplary embodiment of an anchor 23, such as is depicted by FIG. 1. Note that any of the other anchors 21-22, 24 and 25-27 may be configured similarly to or identical to the anchor 23 depicted by FIG. 4. The exemplary anchor 23 shown by FIG. 4 comprises logic 33, referred to hereafter as "anchor logic," which may be implemented in software, firmware, hardware, or any combination thereof. In FIG. 4, the anchor logic 33 is implemented in software and stored in memory 32. However, other configurations of the anchor logic 33 are possible in other embodiments. Note that the anchor logic 33, when implemented in software, can be stored and transported on any computer-readable medium for use by or in connection with an instruction execution apparatus that can fetch and execute instructions.

The exemplary embodiment of the anchor 23 depicted by FIG. 4 includes at least one conventional processor 35, which comprises processing hardware for executing instructions stored in the memory 32. As an example, the processor 35 may comprise a central processing unit (CPU) or a digital signal processor (DSP). The processor 35 communicates to and drives the other elements within the anchor 23 via a local interface 47, which can include at least one bus. The anchor 232, further includes a communication interface 46 to communicate wirelessly or otherwise with other nodes in the network 20. As an example, the communication interface 46 may comprise an RF radio or other type of wireless device for communicating with other anchors, the network controller 41, and/or the tag 52. Furthermore, an input interface 44, for example, a keypad, can be used to input data from the user, and an output interface 45, for example, a liquid crystal display (LCD) or other display apparatus, can be used to output data to the user.

The anchor 23 further comprises stun data 34 stored in the memory 32. The stun data 34 may identify which tag 52 or tags that the anchor has been instructed to stun by the network controller 41. In this regard, while the tag 52 is in the sleep state during a sleep/wake cycle, the network controller 41 may transmit to one or more anchors 21-24 a command to stun the tag 52 on receipt of the tag status message from the tag 52. The stun data 34 may be a list of tag identifiers identifying the tags to be stunned by the anchor 23, as instructed by the network controller 41.

In some embodiments, each tag identified in the stun data 34 may remain valid for a predefined period of time from the time that the identifier was written in the memory 32 so that the tag 52 is not stunned by the anchor 23 after an excessive amount of time has passed since the anchor 23 was instructed to stun the tag 52 by the network controller 41. For example, after receiving an instruction to stun the tag 52, the anchor 23 may not hear from the tag 52 for several sleep/wake cycles, such as when the tag 52 moves away from the anchor 23, such that by the time the anchor 23 hears from the tag 52, it is likely that the tag 52 has been stunned by another anchor and has already communicated with the network controller 41. By removing or otherwise invalidating the tag identifier after a certain amount of time has elapsed, unnecessary attempts to stun the tag 52 may be prevented.

From time-to-time, the anchor logic 33 is configured to communicate messages between the network controller 41 and the tag 52 via the communication interface 46. In an exemplary embodiment, the anchor logic 33 may identify the tag 52 to be stunned, may re-transmit the stun command or other message (e.g., a firmware update) to the identified tag 52 or other anchors in the network 20. In the depicted embodiment, the anchor logic 33 may re-transmit the tag status message from the stunned tag 52 to the network controller 41 or other anchors 21-24 in the network 20.

Further, in the depicted embodiment, on receipt of the tag status message by an anchor 21-24, the anchor logic 33 may check the stun data 34 to determine if the tag 52 should be stunned and, if so, transmits the stun command to the tag 52. In some embodiments, the anchor logic 33 may determine the tag 52 to be stunned by comparing the network address of the tag 52 that transmitted the tag status message (e.g., the source address of the tag status message) with that of the network address available in the stun data 34 of the anchor's memory 32. In other embodiments, other ways of determining the tags to be stunned are possible.

Figure 5:
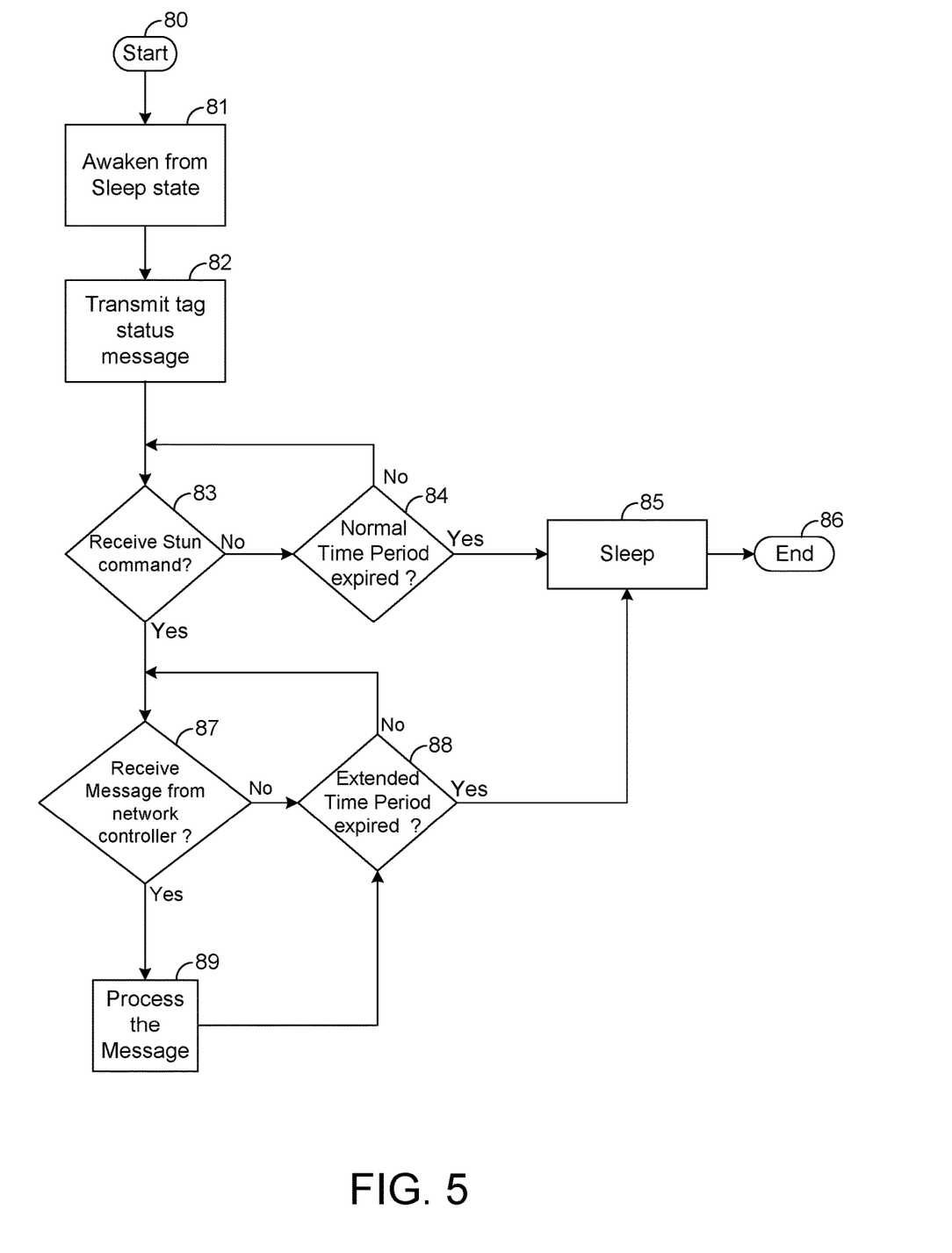
FIG. 5 is a flowchart illustrating an exemplary operation of a tag, such as is depicted by FIG. 1.

FIG. 5 is a flowchart illustrating an exemplary operation of a tag 52, such as is depicted by FIG. 1. From time-to-time, the network controller 41 may need to send a message, e.g., a firmware update, to the tag 52 and thus wish to stun the tag 52 once the tag 52 transitions to an awake state in order to keep the tag awake long enough to receive the desired message or messages from the network controller 41. When the tag is in the sleep state, the network controller 41 may transmit a multicast message to notify one or more anchors 21-24 to stun the tag 52 on receipt of a tag status message or other type of message from the tag 52. For illustrative purposes, assume that the foregoing message is received by each of the anchors 21-24, and each anchor 21-24 in response updates its stun data 34 (FIG. 4) to indicate that the tag 52 is to be stunned.

Once the tag awakens from a sleep state, as shown by block 81 of FIG. 5, the tag 52 transmits a tag status message that is received by one or more anchors 21-24, which forwards the tag status message through the network 20 so that the message eventually reaches the network controller 41 informing such controller 41 that the tag 52 is now awake. Note that the tag 52 may perform other functions not depicted by FIG. 5 after transitioning to the awake state. As an example, the tag 52 may take samples from one or more sensors and report measurements by the sensors in the tag status message or other messages transmitted by the tag 52. The tag 52 may perform other functions, such as controlling one or more devices based on a desired control algorithm. The tag 52 may perform yet other functions in other embodiments.

After transmitting the tag status message, the tag 52 determines whether a stun command is received by the tag 52, as shown by block 83 of FIG. 5. If the tag 52 does not receive a stun command within the Normal Awake Period, then the tag transitions to the sleep state, as shown by blocks 84 and 85 of FIG. 5.

However, in the instant embodiments, assume that at least one of the anchors 21-24 transmits a stun command in response to receiving the tag status message or other message from the tag 52. In this regard, when an anchor 21-24 receives a tag status message or other message from the tag 52, the anchor logic 33 may check its stun data 34 to see if the tag 52 is identified by such data 34. If so, the anchor logic 33 may transmit a stun command to the tag 52. After transmitting the stun command, the anchor logic 33 may delete or otherwise invalidate the tag's identifier in the stun data 34 so that the tag 52 is not stunned again in response to a future message from the tag 52 unless the anchor receives another instruction from the network controller 41 or otherwise in the future to stun the tag 52.

The Normal Awake Period is preferably long enough so that the tag 52 remains awake sufficiently long in order to receive the stun command before the expiry of the Normal Awake Period. Thus, in the instant embodiment, the tag 52 should receive a stun command from an anchor 21-24 prior to expiration of the Normal Awake Period. In response, the tag 52 does not transition to the sleep state until expiration of the Extended Time Period, as shown by blocks 87, 88, and 85, such that the tag 52 remains awake longer than the Normal Awake Period. In this regard, the Extended Time Period is preferably long enough to enable the network controller 41 to transmit a message to the tag 52 in response to the tag status message or other message from the tag 52 before expiration of the Extended Time Period. After receiving the message from the network controller 41, the tag 52 processes the message as shown by block 89. As an example, if the network controller 41 transmits a message containing a software update, the tag 52 may store the software update in memory and update its configuration with such software either in the current sleep/wake cycle or in a future sleep/wake cycle. Once the Extended Time Period expires, the tag 52 may revert to the sleep state, as shown by blocks 88 and 85 of FIG. 5.

Now, therefore, the following is claimed:

1. A communication system, comprising:
   a plurality of nodes forming a wireless network;
   a tag configured to communicate with the nodes and to operate in a plurality of sleep/wake cycles, including at least a first sleep/wake cycle and a second sleep/wake cycle, wherein for the first sleep/wake cycle the tag is configured to transition from a sleep state to an awake state and to transition from the awake state back to the sleep at an end of a first time period if the tag is not stunned by the plurality of nodes during the awake state for the first sleep/wake cycle; and
   a network controller configured to transmit a first message instructing at least one of the nodes to stun the tag, the at least one of the nodes configured to update, in response to the first message prior to receiving a second message from the tag, stun data stored at the at least one of the nodes such that the stun data indicates that the tag is to be stunned,
   wherein the at least one of the nodes is configured to receive the second message from the tag after receiving the first message from the network controller, the at least one of the nodes configured to determine, in response to the second message from the tag and based on the stun data updated by the at least one of the nodes prior to receiving the second message from the tag, that the tag is to be stunned and to stun the tag by transmitting a stun command to the tag in response to the second message from the tag, wherein the tag in response to the stun command is configured to remain in the awake state for the first sleep/wake cycle until an end of a second time period that expires after the first time period such that the tag remains awake sufficiently long to receive a third message transmitted by the network controller after the tag has transitioned from the sleep state to the awake state for the first sleep/wake cycle.

2. The communication system of claim 1, wherein the at least one of the nodes is configured to transmit the second message to the network controller, and wherein the network controller is configured to transmit the third message in response to the second message.

3. The communication system of claim 1, wherein the stun data includes an identifier identifying the tag, and wherein the at least one of the nodes is configured to invalidate the identifier for use in stunning the tag upon expiration of a predefined time period.

4. The communication system of claim 1, wherein the stun data includes an identifier identifying the tag, and wherein the at least one of the nodes is configured to invalidate the identifier for use in stunning the tag upon transmission of the stun command to the tag.

5. The communication system of claim 4, wherein the at least one of the nodes is configured to invalidate the identifier for use in stunning the tag by deleting the identifier from the stun data.

6. A communication method, comprising:
   communicating with a tag using a plurality of nodes of a wireless network, wherein the tag operates in a plurality of sleep/wake cycles, including at least a first sleep/wake cycle and a second sleep/wake cycle, and wherein for the first sleep/wake cycle the tag is configured to transition from a sleep state to an awake state and transition from the awake state back to the sleep state at an end of a first time period if the tag is not stunned by the plurality of nodes during the awake state for the first sleep/wake cycle;
   transmitting a first message from a network controller to at least one of the nodes for instructing the at least one of the nodes to stun the tag;
   updating stun data stored at the at least one of the nodes in response to the first message such that the stun data indicates that the tag is to be stunned;
   receiving by the at least one of the nodes a second message from the tag after receiving the first message from the network controller, wherein the storing updating is performed prior to the receiving the second message;
   determining, by the at least one of the nodes in response to the second message and based on the updated stun data, that the tag is to be stunned;
   stunning the tag by the at least one of the nodes by transmitting a stun command to the tag in response to the second message from the tag based on the determining, wherein the tag in response to the stun command is configured to remain awake until an end of a second time period that expires after the first time period such that the tag remains awake sufficiently long to receive a third message transmitted by the network controller after the tag has transitioned from the sleep state to the awake state for the first sleep/wake cycle.

7. The method of claim 6, further comprising transmitting the third message from the network controller in response to the network controller receiving the second message.

8. The method of claim 6, wherein the stun data includes an identifier identifying the tag, and wherein the method further comprises invalidating the identifier for use in stunning the tag by the at least one of the nodes upon expiration of a predefined time period.

9. The method of claim 6, wherein the stun data includes an identifier identifying the tag, and wherein method further comprises invalidating the identifier for use in stunning the tag by the at least one of the nodes upon transmission of the stun command to the tag.

10. The method of claim 9, wherein the invalidating comprises deleting the identifier from the stun data by the least one node.

\* \* \* \* \*